Patented June 19, 1951

2,557,920

UNITED STATES PATENT OFFICE 2,557,920

METHOD FOR PRODUCTION OF AMINO ACIDS

Halbert C. White, Midland, Mich., assignor to The Dow Chemical Company, Midland, Mich., a corporation of Delaware No Drawing. Application November 7, 1946, Serial No. 708,461

11 Claims. (Cl. 260—319)

This invention concerns an improved method for the production of alpha-amino monocarboxylic acids, or their alkali metal salts, from hydantoins having the general formula:

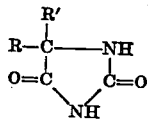

wherein R and R' each represents hydrogen or a monovalent organic radical having a carbon atom thereof attached to the hydantoin nucleus. It pertains particularly to the production of amino acids, such as tryptophane and methionine, which at room temperature are only slightly soluble in water. The method of the invention is one which permits convenient and economical production of alpha-amino monocarboxylic acids, especially those which are sparingly soluble in water, in a continuous manner.

It is known that hydantoins, when subjected to hydrolysis, e. g. with an aqueous alkali solution, react slowly with formation of a series of hydrolysis and decomposition products including a corresponding hydantoic acid as an initial product and an alpha-amino monocarboxylic acid as one of the subsequent products. Such hydrolyses have heretofore been carried out by heating, at atmospheric pressure, a hydantoin together with an aqueous solution of a hydrolyzing agent such as sulphuric acid, hydrochloric acid, hydrobromic acid, barium hydroxide, or potassium hydroxide, etc. Because of the long periods of heating, particularly when using alkaline hydrolyzing agents, required to form a substantial amount of an alpha-amino monocarboxylic acid, the low yields of the latter, and difficulties encountered in purifying the crude product, such hydrolysis, as heretofore carried out, is not satisfactory as a step in the manufacture of alpha-amino acids.

In a copending application of J. E. Livak et al., Serial No. 708,469, now U. S. Patent No. 2,527,366, filed concurrently herewith, it is disclosed that a hydantoin may be hydrolyzed rapidly to form a barium salt of a corresponding alpha-amino monocarboxylic acid in good yield by heating the hydantoin together with an aqueous barium hydroxide solution in a closed vessel at superatmospheric pressure to temperatures in the order of 115°–210° C., but that these reaction conditions are not satisfactory for alkaline hydrolyzing agents in general, since the similar employment of ammonia or lime in place of the barium hydroxide results in excessive by-product formation and an unsatisfactorily low yield of the alpha-amino monocarboxylic acid or in formation of a badly discolored amino acid which cannot satisfactorily be decolorized. Barium hydroxide, itself, is unsatisfactory as an agent for the hydrolysis of hydantoins at atmospheric pressure. It is further disclosed that during hydrolysis of a hydantoin with barium hydroxide under pressure at temperatures above the atmospheric boiling point of the mixture, barium carbonate is formed and precipitated. It is evident that such hydrolysis of a hydantoin with barium hydroxide is not well-adapted to continuous operation, e. g. by passage of the hydrolysis mixture through a tubular autoclave, since the barium carbonate which is precipitated would tend to cause plugging.

In the aforementioned copending application of J. E. Livak et al., it is further disclosed that, although such hydrolysis of hydantoins with barium hydroxide at temperatures of from 115° to 210° C. may be applied in producing any of a wide variety of alpha-amino monocarboxylic acids, it is best adapted to the production of amino acids which are highly soluble in water. The reason for this is that subsequent to the hydrolysis fewer steps are involved in recovering from such hydrolysis mixture a pure crystalline amino acid which is readily soluble in water than are involved in recovering, in pure crystalline form, a free amino acid which is only sparingly soluble in water.

I have now discovered that alkaline alkali metal compounds, particularly alkali metal hydroxides or carbonates, may be employed for the hydrolysis of hydantoins to produce corresponding alpha-amino monocarboxylic acids, or their alkali metal salts, rapidly and in excellent yield, provided the hydrolysis is carried out at superatmospheric pressure and at temperatures above 130° C., e. g. between 140° and 300° C. Not only does the employment of these elevated temperatures and pressures result in a great increase in the rate of hydrolysis over that obtainable at atmospheric pressure, but, contrary to expectation, the increase in the hydrolysis temperature and pressure results in an improved yield of the alpha-amino monocarboxylic acid product.

I have further found that such hydrolysis of a hydantoin with an aqueous alkali metal hydroxide or carbonate may conveniently be accomplished in continuous manner, e. g. by passage of the hydrolysis mixture through a tubular autoclave. With regard to this point it may be mentioned that, under the hydrolysis conditions required by the invention, the reaction occurs at a rate sufficiently rapid to permit nearly complete reaction during a single pass through a tubular autoclave of a conventional length; that the hydrolysis mixture is substantially non-corrosive toward usual structural metals, e. g. iron or steel; and that the hydrolysis of a hydantoin with an aqueous alkali metal hydroxide or carbonate does not involve formation of a precipitate, hence, there is no tendency for the autoclave to become plugged.

I have still further found that although the hydrolysis procedure of this invention may be applied in hydrolyzing any hydantoin to form a corresponding alpha-amino monocarboxylic acid in good yield, it is of particular advantage when applied in the hydrolysis of hydantoins that yield amino acids which, when in free state, are sparingly soluble in water, i. e. which form saturated aqueous solutions of less than 5 per cent concentration at 25° C. The hydrolysis results in formation of an aqueous solution of an alkali metal salt of the amino acid product and an alkali metal carbonate as well as other inorganic salts, e. g. NaCl or KCl, etc., if present in the starting materials.

When the amino acid, in free form, is only sparingly soluble in water, it may be precipitated by treating the alkaline hydrolysis mixture with an acid in amount sufficient to render it substantially neutral, e. g. of pH value between 5 and 8 and the precipitated amino acid may be separated, washed free of mother liquid, and dried to obtain it in excellent yield and in a form of high purity. When the free amino acid is highly soluble in water, such precipitation by neutralization of the hydrolysis mixture is not possible. Recovery of the crystalline alkali metal salt of the amino acid in pure form by fractional crystallization from the hydrolysis mixture is possible, but difficult to accomplish.

I have found that a water-soluble amino acid may be recovered from an alkaline hydrolysis mixture by treating the latter with a lower aliphatic carboxylic acid, e. g. formic, propionic, or preferably acetic acid, in amount sufficient to render the mixture approximately neutral or slightly acidic, thereafter evaporating the mixture substantially to dryness, and extracting the salt, e. g. sodium or potassium acetate, etc., from the residue with methanol to leave the amino acid undissolved. Such procedure for the recovery of a crystalline water-soluble amino acid from a hydrolysis mixture is far less convenient than the aforementioned precipitation procedure which may be applied in recovering a sparingly soluble amino acid from a hydrolysis mixture. Moreover, it has been my experience to find that in general the yield of crystalline amino acid is higher when the amino acid resulting from the hydrolysis is sparingly soluble in water than when it is highly soluble. Whether this is due to a difference in yields of the amino acid salts formed in the hydrolysis reactions or to an inability to obtain substantially complete recovery of the readily soluble free amino acids as crystalline products is not known.

Examples of hydantoins which may be hydrolyzed in accordance with the invention are hydantoin itself, 5-methyl-hydantoin, 5,5-dimethyl-hydantoin, 5-ethyl-hydantoin, 5,5-diethyl-hydantoin, 5-propyl-hydantoin, 5-isopropyl-hydantoin, 5-butyl-hydantoin, 5-sec.-butylhydantoin, 5-iso-butyl-hydantoin, 5-phenyl-hydantoin, 5-benzyl-hydantoin, 5-(beta-methylmercaptoethyl) hydantoin, and 5-(3-indolylmethyl) hydantoin, etc. The invention is concerned especially with the hydrolysis of 5-(beta-methylmercaptoethyl) hydantoin and 5-(3-indolylmethyl) hydantoin to obtain the respective sparingly soluble amino acids, dl-methionine and dl-tryptophane.

The hydrolysis of a hydantoin in accordance with the invention may be carried out batchwise or in continuous manner. When operating batchwise, a bomb or autoclave is charged with a mixture of one of the aforementioned hydantoins and an aqueous solution of an alkali metal hydroxide or carbonate, e. g. NaOH, KOH, $Na_2CO_3$, or $K_2CO_3$. The aqueous alkali solution may be of any desired concentration, but usually contains between 2 and 10 per cent by weight of the alkali. It is known that aqueous alkali metal hydroxide and aqueous alkali metal carbonate solutions of such usual concentrations are normally liquid, i. e. they are liquid at room temperature. Two or more, preferably from 2 to 4, molecular equivalents of the alkali are usually employed per mole of the hydantoin, but the alkali may be used in a somewhat smaller proportion or in as great a proportion as desired.

The mixture is heated in the closed bomb or autoclave at temperatures above 130° C., e. g. from 130° to 300° C. or higher and preferably between 140° and 250° C., until the hydrolysis reaction is nearly complete. Since the hydrolysis to form an amino monocarboxylic acid salt results in formation of one molecular equivalent of ammonia per mole of the hydantoin consumed, the extent of the reaction may be determined at any time by withdrawing an aliquot portion of the reaction mixture and determining the ammonia content thereof. When operating at a temperature of 150° C., the reaction usually is nearly complete in one half hour. At higher temperatures it may be completed in a shorter time, e. g. in some instances in about one minute. The mixture is advantageously cooled, e. g. to less than 130° C., as promptly as possible after completion of the hydrolysis reaction, since longer heating may result in decomposition of a portion of the product.

After completion of the reaction, the mixture is treated with a decolorizing agent, e. g. activated carbon or a bleaching earth, and filtered. In instances in which the hydantoin subjected to hydrolysis is one that forms an amino acid which, in free form, is sparingly soluble in water, the filtrate is brought to a pH value of from 5 to 8, preferably from 6 to 7.5, by treatment with an acid, such as hydrochloric, hydrobromic, sulphuric, or acetic acid, etc., whereby the amino acid is precipitated in free form. The precipitate is separated, e. g. by filtration, washed free of adhering mother liquor, and dried. The crystalline amino acid product, thus obtained, is usually of excellent purity.

When the hydantoin subjected to the hydrolysis is one which yields an amino acid of fairly high solubility in water, the crude hydrolysis mixture is neutralized or acidified by treatment with a lower aliphatic carboxylic acid, preferably acetic acid, and the mixture is evaporated, preferably under vacuum, substantially to dryness. The residue comprises the amino acid product, which is only sparingly soluble in methanol, and salts such as sodium or potassium acetate, etc., which are more readily soluble in the alcohol. The salts are extracted from the residue with a lower aliphatic alcohol, preferably methanol, to leave the crystalline amino acid in purified form.

The procedure, in producing an amino acid in continuous manner, is similar to that just described except that the hydrolysis is accomplished by passing the aqueous hydrolysis mixture, comprising a hydantoin and an alkali metal hydroxide or carbonate, at a pressure sufficient to maintain the same largely, or entirely, in liquid form, through an autoclave, preferably of tubular construction, where the mixture is heated at temperatures above 130° C. The mixture flows from the autoclave through a valve for reducing the pressure. The mixture is preferably cooled, e. g. during flow through a final section of a tubular autoclave to a temperature of 100° C. or lower, prior to release of the pressure. However, the mixture may flow from the autoclave while at the hydrolyzing temperature, in which case heat stored in the mixture causes evaporation of liquor and concentration of the amino acid product. The steps for recovery of the crystalline amino acid from the hydrolysis mixture are as hereinbefore described with regard to the batchwise mode of operation.

The following examples describe ways in which the principle of the invention has been applied and illustrate certain of its advantages, but are not to be construed as limiting the invention.

EXAMPLE 1

In each of a series of experiments, a mixture of one molecular equivalent of 5-(3-indolylmethyl) hydantoin and 3.2 moles of sodium hydroxide, as a dilute aqueous sodium hydroxide solution of approximately 4 per cent concentration, was heated to a reaction temperature. The experiments differed from one another with regard to the temperature and time of heating. In one experiment the mixture was heated to boiling under reflux at atmospheric pressure for a period of 16 hours. In each of the other experiments the mixture was heated with agitation at the autogenous pressure inside a steel bomb. Thereafter, each mixture was cooled to below 100° C., treated while warm, e. g. at about 80°–90° C., with a minor amount of activated charcoal for purpose of removing colored impurities, and filtered. The filtrate was neutralized with acetic acid, whereby tryptophane was precipitated. The precipitate was separated by filtration, washed with alcohol and dried. The product was weighed and its melting point was determined. Table I gives the time and temperature of heating in carrying out each hydrolysis reaction, the per cent yield of tryptophane, based on the 5-(3-indolylmethyl) hydantoin starting material, and the melting point of the crystalline tryptophane product. When pure, dl-tryptophane melts at approximately 283°–286° C.

Table I

| Run No. | Hydrolysis Conditions | | | Tryptophane | |
|---|---|---|---|---|---|
| | Time | Temp., °C. | Pressure | Per Cent Yield | M. P., °C. |
| 1 | 16 Hrs | 105 | Atmospheric | 75.5 | 275 |
| 2 | 2 Hrs | 130 | Autogenous | 57.8 | 274 |
| 3 | 40 Min | 150 | do | 90.0 | 282–284 |

EXAMPLE 2

A series of experiments were carried out similar to those of Example 1, except that the hydantoin subjected to hydrolysis was 5-(beta-methylmercaptoethyl) hydantoin and the amino acid product was dl-methionine, which, when pure, melts at approximately 281° C. Table II gives the conditions of time and temperature under which each hydrolysis was carried out, the per cent yield of dl-methionine based on the 5-(beta-methylmercaptoethyl) hydantoin subjected to the hydrolysis, and the melting point of the methionine product.

Table II

| Run No. | Hydrolysis Conditions | | | Methionine | |
|---|---|---|---|---|---|
| | Time | Temp., °C. | Pressure | Per Cent Yield | M. P., °C. |
| 1 | 16 Hrs | 105 | Atmospheric | 48 | 230 |
| 2 | 25 Min | 150 | Autogenous | 74 | 264–267 |
| 3 | 10 Min | 165 | do | 74.3 | 270 |

EXAMPLE 3

In each of two experiments, one molecular equivalent of 5-(3-indolylmethyl) hydantoin was admixed with 3.2 molecular equivalents of an alkali in the form of an aqueous alkali solution of approximately 1.05 molar concentration, i. e. containing 1.05 gram molecular equivalents of the alkali per liter of the aqueous solution thereof. The alkalies employed in the respective experiments were sodium carbonate and potassium hydroxide. In each experiment, the hydrolysis mixture was heated with agitation in a bomb at a temperature of 150° C. for 30 minutes, after which the bomb was cooled, opened and the tryptophane was separated in crystalline form as in Example 1. In the experiment in which sodium carbonate was used as the hydrolyzing agent, the yield of tryptophane was 74.4 per cent of theoretical, based on the 5-(3-indolylmethyl) hydantoin starting material. In the experiment wherein potassium hydroxide was employed as the hydrolyzing agent, the yield of tryptophane was 84.3 per cent of theoretical.

EXAMPLE 4

In each of a series of experiments, a mixture of one molecular equivalent of the hydantoin named in Table III and 3.2 moles of sodium hydroxide, as an aqueous sodium hydroxide solution of approximately 4 per cent concentration, was heated with agitation in a bomb for the time and at the temperature also given in the table. The bomb was then cooled, opened, and the hydrolysis mixture was treated with activated charcoal and filtered. The filtrate was neutralized with acetic acid. The mixture was then evaporated under vacuum to dryness, and the residue was washed with methanol to extract sodium acetate therefrom. The table names and gives the per cent yield of the purified crystalline amino acid obtained as a residue from the washing operation.

Table III

| Run No. | Hydantoin | Hydrolyzing Conditions | | Amino Acid | |
|---|---|---|---|---|---|
| | | Time, Minutes | Temp., °C. | Kind | Per Cent Yield |
| 1 | 5-isobutyl hydantoin | 30 | 150 | leucine | 84 |
| 2 | 5-(sec.-butyl) hydantoin | 30 | 150 | isoleucine | 58 |
| 3 | 5-methyl hydantoin | 40 | 150 | alanine | 65 |

EXAMPLE 5

In each of a series of experiments, 5-(3-indolylmethyl) hydantoin was hydrolyzed by reaction with an aqueous sodium hydroxide solution of about 4 per cent concentration and the tryptophane product was isolated as in Example 1. Each hydrolysis was carried out by heating a mixture of one molecular equivalent of 5-(3-indolylmethyl) hydantoin and 3.2 moles of sodium hydroxide, as an aqueous solution of the concentration just mentioned, with agitation in a steel bomb. The experiments differed from one another with regard to the time and temperature of heating. Table IV gives the conditions of time and temperature of heating for each hydrolysis reaction, and the per cent yield and melding point of the crystalline dl-tryptophane product.

*Table IV*

| Run No. | Hydrolyzing Conditions | | dl-Tryptophane | |
|---|---|---|---|---|
| | Time, Minutes | Temp., °C. | M. P., °C. | Per Cent Yield |
| 1 | 1 | 200 | 276 | 66.5 |
| 2 | 10 | 200 | 275 | 82.1 |
| 3 | 1 | 225 | 282 | 69.5 |
| 4 | 10 | 225 | 270 | 78.3 |
| 5 | 10 | 250 | 276 | 75.4 |

From this data it is evident that the yield and purity of the product are dependent on the conditions of time and temperature employed in the hydrolysis and that as the temperature is raised the time of heating may advantageously be shortened. It is also evident that by limiting the time of reaction, temperatures of 250° C. or higher may satisfactorily be employed in carrying out the hydrolysis. By carrying the reaction out in continuous manner, e. g. within a tubular autoclave, the time of heating may readily be controlled.

EXAMPLE 6

A mixture of approximately 1.48 gram molecular equivalents of 5-(3-indolylmethyl) hydantoin, 3 gram moles of sodium hydroxide and 5 kilograms of water was passed, at a pressure of about 200 pounds per square inch, gauge, through a tubular autoclave where it was heated to approximately 165° C. The mixture flowed from the autoclave through a valved outlet and to a condenser where it was cooled to below 100° C. The rate of flow was such that the contact time, i. e. the time required for an infinitesimal portion of the mixture to pass through the autoclave, was approximately 10 minutes. As the mixture flowed from the reaction system, it was treated with a minor amount of activated carbon, filtered, and the filtrate was neutralized with acetic acid so as to precipitate the tryptophane product. The latter was removed by filtration, washed with ethyl alcohol, and dried. There was obtained white, crystalline dl-tryptophane of melting point 283°–286° C. in a yield of 82.6 per cent of theoretical, based on the 5-(3-indolylmethyl) hydantoin subjected to the hydrolysis.

EXAMPLE 7

A mixture of approximately 0.5 gram molecular equivalent of 5-(beta-methylmercaptoethyl) hydantoin, 1.5 gram moles of sodium hydroxide and 1.5 kilograms of water was passed, at a pressure of about 200 pounds per square inch, gauge, through a tubular autoclave where it was heated to 165° C. The mixture flowed from the autoclave through a valve outlet and thence to a cooling unit. The rate of flow corresponded to a contact time of 10 minutes. The procedure in recovering the amino acid product from the reaction mixture was similar to that employed in Example 6. White crystalline dl-methionine, melting at 274°–275° C., was obtained in 80.6 per cent of the theoretical yield, based on the 5-(beta-methylmercaptoethyl) hydantoin subjected to the hydrolysis.

Other hydantoins may be hydrolyzed by the method, as herein described, to obtain corresponding alpha-amino monocarboxylic acids in good yields. For instance, the invention may be applied in hydrolyzing 5,5-dimethyl-hydantoin to obtain alpha-amino-isobutyric acid or in hydrolyzing 5-ethyl-5-methyl-hydantoin to obtain alpha-amino-alpha-methyl-butyric acid, etc.

Other modes of applying the principle of the invention may be employed instead of those explained, change being made as regards the method herein disclosed, provided the step or steps stated by any of the following claims or the equivalent of such stated step or steps be employed.

I therefore particularly point out and distinctly claim as my invention:

1. A method, as described in claim 11, wherein the hydantoin is one which undergoes hydrolysis to form a salt of an alpha-amino monocarboxylic acid, which free amino acid is sparingly soluble in water, and wherein the amino acid is precipitated by bringing the hydrolysis mixture to a pH value between 5 and 8 and is separated from the mixture.

2. A method, as described in claim 5, wherein the hydantoin subjected to hydrolysis is 5-(3-indolylmethyl) hydantoin, and, subsequent to the hydrolysis, tryptophane is precipitated by bringing the hydrolysis mixture to a pH value between 5 and 8 and is separated from the mixture.

3. A method, as described in claim 9, wherein the alkali comprises an alkali metal hydroxide and the hydrolysis is carried out at temperatures between 130° and 300° C.

4. A method, as described in claim 9, wherein the alkali is sodium hydroxide, the hydantoin is 5-(3-indolylmethyl) hydantoin, the hydrolysis is carried out at temperatures between 140° and 250° C. and thereafter tryptophane is precipitated by rendering the hydrolysis mixture substantially neutral.

5. In a method wherein a hydantoin having the general formula:

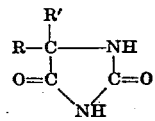

in which R and R' each represents a member of the group consisting of hydrogen and monovalent organic radicals having a carbon atom thereof attached to the hydantoin nucleus, is hydrolyzed with an aqueous alkali, the step of accomplishing the hydrolysis by heating the hydantoin together with a normally liquid aqueous solution of an alkali of the class consisting of alkali metal hydroxides and alkali metal carbonates to a reaction temperature above 130° C. at a superatmospheric pressure sufficient to maintain a major portion of the mixture in liquid condition.

6. The method which comprises hydrolyzing 5-(beta-methylmercaptoethyl) hydantoin by heating the same together with a normally liquid aqueous solution of an alkali, selected from the class consisting of alkali metal hydroxides and carbonates, to a reaction temperature above 130° C. at a superatmospheric pressure sufficient to maintain a major portion of the mixture in liquid condition, thereafter precipitating methionine from the hydrolysis mixture by bringing the latter to a pH value between 5 and 8 and separating methionine from the mixture.

7. A method which comprises hydrolyzing 5-(beta-methylmercaptoethyl) hydantoin by heating one molecular equivalent of the same with a from about 2 to about 10 per cent aqueous solution of at least two molecular equivalents of an alkali, selected from the class consisting of alkali metal hydroxides and alkali metal carbonates, at a superatmospheric pressure as high as the autogenous pressure to a reaction temperature between 130° and 300° C. for a time not greatly in excess of that required for completion of the hydrolysis reaction, thereafter precipitating methionine from the hydrolysis mixture by bringing the latter to a pH value between 5 and 8 and separating methionine from the mixture.

8. A method which comprises hydrolyzing 5-(beta-methylmercaptoethyl) hydantoin by heating one molecular equivalent of the same together with a from about 2 to about 10 per cent aqueous solution of at least two molecular equivalents of an alkali metal hydroxide at an autogenous superatmospheric pressure to a temperature between 140° and 250° C. until hydrolysis of the 5-(beta-methylmercaptoethyl) hydantoin is substantially complete, thereafter promptly cooling the mixture to a temperature below 130° C., precipitating methionine from the mixture by bringing the latter to a pH value between 5 and 8, and separating methionine from the mixture.

9. In a method wherein a hydantoin having the general formula:

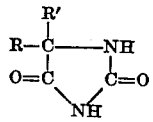

in which R and R' each represents a member of the group consisting of hydrogen and monovalent organic radicals having a carbon atom thereof attached to the hydantoin nucleus, is hydrolyzed with an aqueous alkali to form a salt of an alpha-amino monocarboxylic acid, the step of accomplishing the hydrolysis in a continuous manner by passing a mixture of one molecular equivalent of such hydantoin and a from about 2 to about 10 per cent aqueous solution of at least two molecular equivalents of an alkali selected from the class consisting of alkali metal hydroxides and alkali metal carbonates through a reaction zone where it is heated at an autogenous superatmospheric pressure to a reaction temperature above 130° C. for the time sufficient to hydrolyze a major portion of the hydantoin but not greatly in excess of that required for completion of the hydrolysis.

10. A method which comprises hydrolyzing 5-beta-methylmercaptoethyl) hydantoin in a continuous manner by passing a mixture of one molecular equivalent of 5-beta-methylmercaptoethyl) hydantoin and an aqueous solution of at least two molecular equivalents of sodium hydroxide in a concentration of from about 2 to about 10 per cent by weight through a reaction zone where it is heated at an autogenous superatmospheric pressure to a reaction temperature between 140° and 250° C. for a time sufficient to hydrolyze a major portion of the 5-(beta-methylmercaptoethyl) hydantoin but not greatly in excess of that required for completion of the hydrolysis, and precipitating methionine from the effluent reaction liquor by rendering the latter substantially neutral.

11. In a method wherein a hydantoin is hydrolyzed with an aqueous alkali to form a salt of an alpha-amino monocarboxylic acid, the step of accomplishing the hydrolysis by heating the hydantoin together with a normally liquid aqueous solution of an alkali of the class consisting of alkali metal hydroxides and alkali metal carbonates to a reaction temperature above 130° C. at a superatmospheric pressure sufficient to maintain a major portion of the mixture in liquid condition.

HALBERT C. WHITE.

REFERENCES CITED

The following references are of record in the file of this patent:

UNITED STATES PATENTS

| Number | Name | Date |
|---|---|---|
| 2,480,644 | Goldsmith et al. | Aug. 30, 1949 |
| 2,498,300 | Scott et al. | Feb. 21, 1950 |

OTHER REFERENCES

Urech, Liebig's Annalen, vol. 164 (1872), pp. 264–271.

Heintz, Liebig's Annalen, vol. 169 (1873), pp. 125 to 127.

Pinner, Ber. Deut. Chem., vol. 22 (1889), pp. 695–696.

Blitz et al., Ber. Deut. Chem., vol. 44 (1911), pp. 411 to 412.

Bergmann et al., Liebig's Annalen, vol. 458 (1927), pp. 83, 86, 90, 91, 92.

Boyd et al., Biochem. Journal, vol. 29 (1935), pp. 553 and 2257–2258.

Houben, Die Method der Organischen Chemie, 3rd ed., vol. 4 (1941), p. 789.

Livak et al., Jour. Am. Chem. Soc., vol. 67, December, 1945, p. 2220.